United States Patent [19]

Lefumeux et al.

[11] Patent Number: 4,994,203
[45] Date of Patent: Feb. 19, 1991

[54] COMPOSITE MATERIAL WITH LUBRICATING PROPERTIES, PROCESS FOR THEIR MANUFACTURE AND ANTIEROSIVE COMPONENTS FOR A BARREL WEAPON SYSTEM WHICH CONSISTS OF THESE MATERIALS

[75] Inventors: Alain Lefumeux, Orsay; Serge Raynal, Draveil, both of France

[73] Assignee: Societe Nationale Des Poudres Et Explosifs, Paris Cedex, France

[21] Appl. No.: 280,126

[22] Filed: Dec. 5, 1988

[30] Foreign Application Priority Data

Dec. 18, 1987 [FR] France ............................... 87 17670

[51] Int. Cl.$^5$ .......................................... C10M 107/50
[52] U.S. Cl. .................................. 252/12.2; 252/49.6; 252/565; 102/431
[58] Field of Search .................... 252/10, 11, 12, 12.2, 252/265, 565, 49.6; 102/431; 89/13.05

[56] References Cited

U.S. PATENT DOCUMENTS

| | | | |
|---|---|---|---|
| 3,508,945 | 4/1970 | Haemer et al. | 252/12.2 |
| 3,877,374 | 4/1975 | Cook | 102/431 |
| 4,263,070 | 4/1981 | Price et al. | 102/431 |
| 4,282,813 | 8/1981 | Sterbatzel | 89/13.05 |
| 4,365,558 | 12/1982 | Lippler et al. | 102/431 |
| 4,465,883 | 8/1984 | Lopata et al. | 252/11 |
| 4,532,054 | 7/1985 | Johnson | 252/12 |
| 4,623,472 | 11/1986 | Jamison et al. | 252/12.2 |

*Primary Examiner*—Jacqueline V. Howard
*Attorney, Agent, or Firm*—Bucknam and Archer

[57] ABSTRACT

The invention relates to a composite material with lubricating properties consisting of a solid polymeric matrix such as polystyrene or polymethyl methacrylate containing between 20 and 85% by weight of a liquid oil with lubricating properties, such as a silicone oil.

The material according to the invention is obtained by polymerization of an emulsion of the said oil in a monomer such as styrene or methyl methacrylate monomer in the presence of a surface-active agent which is a two- or three-block block copolymer in which one repeat unit is compatible with the said monomer.

The materials according to the invention are used to form antierosive components for ammunition intended for barrel weapon systems and in particular wads (8) for shells (1).

10 Claims, 2 Drawing Sheets

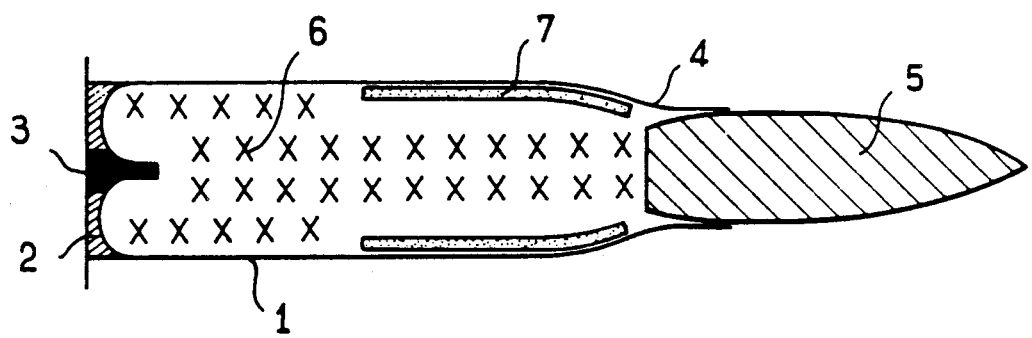
FIG_1
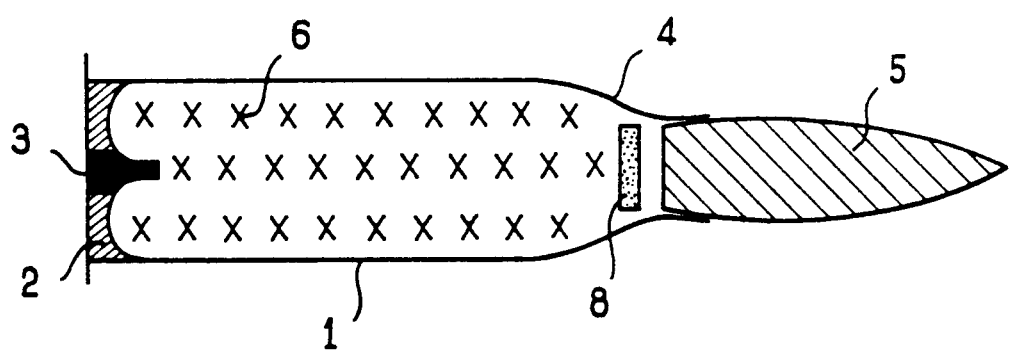
FIG_2

COMPOSITE MATERIAL WITH LUBRICATING PROPERTIES, PROCESS FOR THEIR MANUFACTURE AND ANTIEROSIVE COMPONENTS FOR A BARREL WEAPON SYSTEM WHICH CONSISTS OF THESE MATERIALS

The present invention relates to the field of composite materials with lubricating properties, employed as antierosive components in ammunition for barrel weapon systems.

More precisely, the invention relates to a new type of composite material with lubricating properties, a process for its manufacture and its application to the production of antierosive components intended for equipping ammunition for barrel weapon systems.

The problem of combating the erosion of the barrels of weapon systems is a problem which assumes increasing importance with the development of weapon systems with a high rate of fire.

Erosion of the barrels occurs for two reasons: a mechanical reason due to the friction of the projectile against the inner surface of the barrel and a chemical reason due to the chemical corrosion of the inner surface of the barrel, caused by the hot gases generated by the combustion of the propellant charge.

The mechanical erosion can be remedied quite well by fitting the projectile with an external girdle of a soft and ductile material such as copper, which limits the abrasion of the inner surface of the barrel. This solution is described, for example, in French Patent No. 2,036,458.

On the other hand, the fight against the corrosion caused by the hot gases turns out to be more tricky.

As a general rule, in order to reduce this corrosion, attempts are made to insert into the ammunition, between the propellant charge and the base of the projectile, a body with lubricating properties which will be entrained by the hot gases to be deposited onto the inner surface of the barrel so as to form a protective screen both from a chemical standpoint and from a thermal standpoint.

A first type of body with lubricating properties and employed for this purpose consists of mixtures of waxes and of inorganic fillers such as talc, titanium oxides or tungsten. A solution of this type which is described, for example, in European Patent Application No. 0,235,533, has a major disadvantage: when the ammunition is stored in hot conditions, the waxes tend to melt and this then leads to the ammunition functioning badly when fired.

A second type of body with lubricating properties and used for this purpose consists of sheets or pouches of synthetic material which are filled with lubricating liquid. Thus, U.S. Pat. No. 4,334,477 describes an ammunition in which the propellant charge is surrounded by a sheet of polyacrylonitrile which has absorbed a water-glycol mixture. U.S. Pat. No. 4,282,813, in its turn, describes an ammunition in which a silicone oil encapsulated in a polyester film has been placed between the charge and the base of the projectile. While a solution of this second type no longer has the disadvantage of being heat-sensitive, it has the disadvantage, on the other hand, of not offering a controlled and uniform release of the lubricating liquid in all directions at the time of firing.

The problem of the fight against chemical corrosion by the hot gases in the barrel weapon systems has therefore not been solved in a fully satisfactory manner at the present time.

The object of the present invention is precisely to propose a solution which answers this problem in a fully satisfactory manner.

The subject of the invention relates, therefore, to a composite material with lubricating properties, characterized in that it consists of a solid polymeric matrix containing, in a homogeneous manner, throughout its mass, a dispersion of liquid oil droplets with lubricating properties.

Preferably the solid polymeric matrix consists essentially of polystyrene or of polymethyl methacrylate and the liquid oil consists essentially of a silicone compound.

The invention also relates to a process for obtaining a material according to the invention by preparing, in a first step, an emulsion of the liquid oil with lubricating properties in a liquid phase of a liquid monomer capable of being polymerized by radical polymerization, the monomer not being a solvent for the said liquid oil, in the presence of a surface-active agent and by polymerization, in a second step, of the emulsion by addition of a chemical initiator of radical polymerization or by use of a radiation of electromagnetic type, characterized in that the surface-active agent is a block copolymer comprising two two-block or three-block repeat units, in which one repeat unit is compatible with the liquid oil and in which the other repeat unit is compatible with the monomer, the surface-active agent having a number-average molecular mass of between 500 and 500,000.

Lastly, the invention relates to antierosive components for barrel weapon systems, and especially to wads for artillery shells, characterized in that they consist of a material according to the invention.

The advantage of the material according to the invention lies in the fact that, when subjected to a compression, it functions really like a "wet sponge", releasing the oil with which it is loaded in a controlled and uniform manner in all the directions of ejection. Thus, an antierosive component made of a material according to the invention, inserted between the propellant charge and the base of the projectile of an ammunition for barrel weapon systems, will be compressed under the effect of the pressure rise at the time of the firing of the propellant charge and will eject the liquid oil with lubricating properties in a uniform manner over the whole inner surface of the barrel of the weapon. The compacted solid matrix itself is destroyed by the hot gases.

The invention is described in detail below with reference to FIGS. 1 to 4.

FIG. 1 shows, seen in section, an ammunition comprising an antierosive component according to the invention in a first geometrical configuration.

FIG. 2 shows, seen in section, an ammunition comprising an antierosive component according to the invention in a second geometrical configuration.

Figure 3:
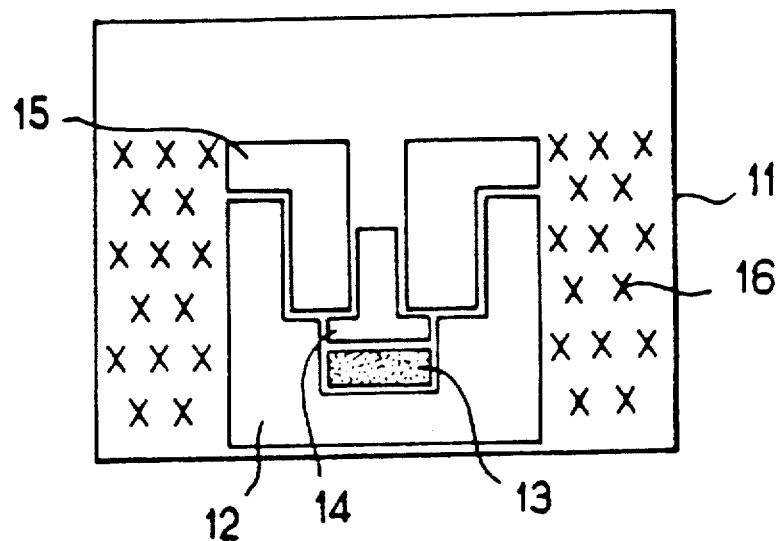
FIG. 3 shows, diagrammatically, an experimental device intended to measure the efficiency of the ejection of oil by the material according to the invention.

The invention relates, therefore, to a composite material consisting of a solid polymeric matrix containing, in a homogeneous manner, throughout its mass, a dispersion of droplets of a liquid oil with lubricating properties. The polymer forming the solid matrix must not be soluble in the liquid oil. Since this polymer is obtained by radical polymerization of an emulsion of the said oil in a liquid monomer, the monomer, precursor of the polymer, must not itself be soluble in the liquid oil either. Various solid polymers may therefore be suitable, so long as they meet the two conditions just stipulated. Polymers of vinyl or acrylic type are suitable within the scope of the present invention. Polystyrene and polymethyl methacrylate will be mentioned as preferred polymers.

The liquid oil employed may be any liquid oil with lubricating properties, natural or synthetic, which remains in the liquid state in the conditions of storage of the ammunition and in the conditions of use in a weapon with a high rate of fire. The oil must therefore remain liquid between $-40°$ C. and $+250°$ C. at least, and preferably between $-65°$ C. and $+300°$ C. An oil consisting essentially of a silicone compound will be advantageously employed. The preferred silicone compounds will be those corresponding to the general formula:

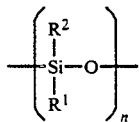

in which:

R$^1$ and R$^2$, which are identical or different, denote the methyl group or the phenyl group, and n is an integer of between 10 and 10,000 and preferably between 50 and 1,000.

A composite material according to the invention may contain up to 85% by weight of liquid oil, dispersed and occluded within the solid matrix. On this topic, it should be noted that, while the material according to the invention operates as a "wet sponge" when it is subjected to compression, at rest this material has the appearance and the consistency of a true solid and that it can be wrought or machined like a solid as long as the droplets of oil are sufficiently fine.

The invention also relates to a process for the manufacture of the material according to the invention. In a first step, this process consists of preparing an emulsion of the said liquid oil with lubricating properties in a continuous liquid phase of a liquid monomer capable of being polymerized by radical polymerization. As has already been stated above, the said monomer must not be a solvent for the liquid oil and, when polymerized, must not produce a polymer soluble in the latter. Monomers of vinyl, styrenic, pyridinic, acrylic or methacrylic structure will be advantageously employed. Styrene and methyl methacrylate will be particularly preferred as monomers.

The said polymerizable liquid monomer may be employed by itself or mixed with a polymer of the same nature as the final solid matrix in order to improve emulsion stability. Up to 30% by weight of polymer may thus be added, relative to the weight of monomer employed.

The emulsion is produced by stirring by means of any known apparatus in the presence of a surface-active agent. In a characteristic manner, the surface-active agent is a block copolymer containing two-block repeat units A-B or three-block repeat units A-B-A or B-A-B, in which one repeat unit is compatible with the liquid oil and in which the other repeat unit is compatible with the said liquid monomer. "Compatibility" between two constituents, within the meaning of the present invention, means the fact that these two constituents are miscible in the form of a single homogeneous phase. The surface-active agent may have a number-average molecular mass of between 500 and 500,000 and preferably between 1,000 and 200,000.

The surface-active agent will be advantageously chosen from two-block or three-block block copolymers of the following type: polyoxyethylene-polydimethylsiloxane, polyoxypropylene-polydimethylsiloxane, polymethyl methacrylate-polydimethylsiloxane, polystyrenepolydimethylsiloxane and polydimethylsiloxane-polyoxyethylene-polyoxypropylene.

Block copolymers of this kind are described, for example, in European Patent Application No. 0,038,979 and in French Patent Applications Nos. 2,314,932 and 2,204,640.

According to a preferred embodiment of the invention, a styrene-based matrix will be chosen, coupled with block copolymers of the polystyrene-polydimethylsiloxane type, or an acrylic matrix coupled with block copolymers of the polyoxyethylene-polydimethylsiloxane, polyoxypropylene-polydimethylsiloxane and polydimethylsiloxane-polyoxyethylene-polyoxypropylene type.

Although, according to the invention, block copolymers are preferred as a surface-active agent, it will also be possible to employ graft copolymers as surface-active agents within the scope of the present invention.

The emulsion may contain between 1 and 20% by weight of surface-active agent relative to the weight of the liquid monomer, but preferably this quantity will be between 1 and 10% by weight.

When the emulsion of oil in the polymerizable monomer is produced, the polymerization of the emulsion is initiated in a second step by the addition of a chemical initiator of radical polymerization or by the use of a radiation of electromagnetic type capable of initiating the polymerization, such as, for example, a UV radiation or an electron bombardment. The use of a radiation of electromagnetic type is limited, however, to products of small thickness, chiefly products in the form of sheets or plates. An azo compound, a percarbonate or a peroxide such as benzoyl peroxide will be advantageously employed as initiator of radical polymerization. The quantity of polymerization initiator will be between 0.1% and 5% by weight relative to the weight of the said polymerizable monomer, and preferably in the region of 1%.

Lastly, in certain cases, it is possible to add to the emulsion a crosslinking agent such as divinylbenzene or carbon tetrabromide, so as to create bridging in the polymeric matrices employed.

The polymerization of the emulsion is generally carried out at a temperature of between 20° C. and 150° C., depending on the means of initiation employed. The polymerization time may be between 2 and 120 hours in the case of polymerization employing a chemical initiator, or of the order of a minute in the case of polymerization employing a radiation of electromagnetic type.

Since the emulsion may contain up to 85% by weight, relative to its entire weight, of liquid oil, the process thus makes it possible to obtain materials with a solid polymeric matrix containing between 20% and 85% of liquid oil relative to their total weight.

The finer the emulsion, the more finely distributed the liquid oil will be in the solid polymeric matrix, a condition which will be obtained proportionally better the higher the concentration of surface-active agent in the emulsion and the lower the molecular mass of the surface-active agent.

Lastly, the invention relates to the application of the materials just described to the production of antierosive components for ammunition intended for barrel weapon systems. These elements may have geometric configurations which are usually adopted in the case of antierosive components already known.

FIG. 1 depicts a sectional view of an ammunition equipped with a component of this kind. This figure shows a shell body 1 with a base 2 crimped to one of its ends. The base 2 carries a primer 3. The end of the shell body 1 away from the base 2 carries a constriction 4 in which a projectile 5 is crimped. The shell body 1 is charged with a charge 6 of propellant powder. In its part close to the projectile 5, the inner surface of the shell body 1 is surrounded by an antierosive component 7, in the form of a sleeve, consisting of a composite material with lubricating properties according to the invention.

A preferred embodiment of the invention is depicted in FIG. 2, viewed in section. This embodiment relates to an ammunition similar to that shown in FIG. 1, in which the antierosive component is in the form of a wad 8 inserted between the propellent charge 6 and the base of the projectile 5.

As already stated above, at the instant of firing, the antierosive component 7 or 8 will be compressed and expelled following the projectile 5 by the hot gases generated by the combustion of the charge 6 and will eject the oil which it contains in all directions against the inner surface of the barrel of the weapon, which will contribute to lowering the temperature of the latter by virtue of the endothermic decomposition of the oil and will thus limit its corrosion of a chemical nature.

The examples which follow illustrate certain possibilities of use of the invention without limiting its scope.

The tests have been carried out with two different silicone oils:
Oil A: polymethylphenylsiloxane: oil with a viscosity of 710 centipoises (cP), that is 0.710 Pa s
Oil B: polydimethylsiloxane: oil with a viscosity of 1,000 cP, that is 1 Pa s.

EXAMPLE 1

In this example, an attempt has been made to manufacture a composite material with lubricating properties without employing a surface-active agent.

12 g of styrene monomer and 0.12 g of benzoyl peroxide (that is 1% by weight relative to the monomer) are added to 18 g of oil A.

The mixture is homogenized by stirring with a centrifugal turbine stirrer rotating at 4,500 revolutions per minute for 5 minutes.

Polymerization is then ensured without stirring in an oven controlled at 80° C. for 24 hours.

A compact material, with an oily feel, is thus obtained, exhibiting spherical cells varying between 20 and 50 microns (micrometres) in dimensions and containing 58% by weight of silicone oil.

EXAMPLE 2

The experiment of Example 1 is restarted, but this time in the presence of a surface-active agent.

11.5 g of styrene monomer, 0.12 g of benzoyl peroxide and 0.30 g of a polystyrene-polydimethylsiloxane block copolymer are added to 18 g of oil A. This two-block copolymer is characterized by a number-average molecular mass of 56,000 in the case of its polystyrene block and of 50,000 in the case of its polydimethylsiloxane block.

The emulsion is produced by stirring for 5 minutes with a centrifugal turbine stirrer rotating at 4,500 revolutions per minute.

Polymerization of the system is carried out in the same conditions as those of Example 1.

A compact material is thus obtained, more rigid and drier than the material of Example 1. The use of the surfactant results in a greater uniformity in the size of the cells, which contain 60% of silicone oil and whose dimensions are between 5 and 25 microns (micrometers).

EXAMPLE 3

26.7 g of styrene monomer, 0.3 g of benzoyl peroxide, 1.5 g of divinylbenzene and 1.5 g of a polystyrene-polydimethylsiloxane block copolymer, as surface-active agent, are added to 70 g of oil A. This two-block copolymer is characterized by a number-average molecular mass of 14,000 in the case of the polystyrene block and of 37,500 in the case of the polydimethylsiloxane block.

The emulsion is produced by stirring for 5 minutes with a centrifugal turbine stirrer rotating at 5,000 revolutions per minute.

The polymerization is carried out at 80° C. for 24 hours without stirring.

A compact material is thus obtained, containing 70% by weight of oil present in the cells, whose size is between 10 and 30 microns (micrometers).

The addition of divinylbenzene makes it possible to obtain a polymer lattice, which doubles the rupture strength of the material at 20° C. relative to that of the material obtained in Example 2.

EXAMPLE 4

26.7 g of styrene monomer, 0.3 g of benzoyl peroxide, 1.5 g of divinylbenzene and 1.5 g of polystyrene-polydimethylsiloxane block copolymer, as surface-active agent, are added to 70 g of oil B. This two-block copolymer is defined by a number-average molecular mass of 5,250 in the case of the polystyrene block and of 10,000 in the case of the polydimethylsiloxane block.

The conditions under which the emulsion is produced and the polymerization carried out are similar to those of Example 3.

A compact material containing 70% by weight of oil B in a polystyrene matrix crosslinked with divinylbenzene is thus obtained. The size of the cells containing the oil is between 10 and 35 microns (micrometers).

EXAMPLE 5

28.2 g of methyl methacrylate, 0.3 g of benzoyl peroxide, 1.5 g of polydimethylsiloxane-polyoxyalkylene two-block block copolymer as surface-active agent, are added to 50 g of oil B. The polyoxyalkylene block itself is made up of a polyoxyethylene block followed by a polyoxypropylene block.

This copolymer is defined by a number-average molecular mass of 7,500, in a proportion of 21% on a numerical basis in the case of the polydimethylsiloxane block, 21% on a numerical basis in the case of the polyoxyethylene block and 58% on a numerical basis in the case of the polyoxypropylene block.

The emulsion is produced by stirring for 6 minutes with a centrifugal turbine stirrer rotating at 5,000 revolutions per minute. This emulsion is then polymerized at 60° C. for 48 hours without stirring.

A very hard and homogeneous block is thus obtained, containing 62% by weight of silicone oil in spherical cells, whose size is between 15 and 45 microns (micrometers).

EXAMPLE 6

The material obtained in Example 3 and containing 70% by weight of oil A was tested in a dynamic compression device shown diagrammatically in FIG. 3.

An anvil 12, in the bottom of which a sample 13 of the material to be tested is placed, is arranged in a manometric enclosure 11. A plunger 14 movable inside a positioning ring 15 can bear on the sample 13.

A quantity of propellant powder 16 is placed inside the manometric enclosure. This quantity of powder is that needed to obtain a pressure of 100 MPa inside the enclosure 11.

After testing, the solid residue originating from the sample 13 now weighs only 35% of its initial weight. The missing 65% represent the weight of oil A released during the dynamic compression.

EXAMPLE 7

Figure 4:
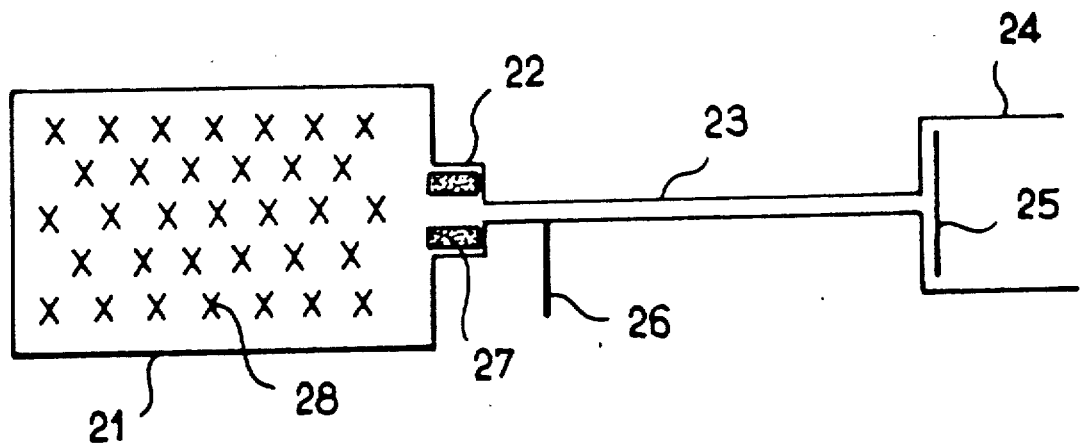
FIG. 4 shows, diagrammatically, an experimental device intended to simulate the operation of an antierosive component according to the invention in a barrel weapon system.

The material obtained in Example 4, which contains 70% by weight of oil B was tested in the device shown diagrammatically in FIG. 4.

The device employed is intended to simulate a shot fired in a barrel weapon system. It consists of a manometric enclosure 21 extended by a chamber 22 which opens into a barrel 23 communicating with a decompression enclosure 24 closed, at the beginning of the test, by a bursting disc 25 calibrated at 280 MPa. A thermocouple 26 arranged 0.2 mm from the inner surface of the barrel 23 makes it possible to obtain the temperature of the inner surface of the barrel 23. A ring 27 made of the material to be tested is arranged in the chamber 22 so as to permit a direct communication between the barrel 23 and the enclosure 21. A quantity of propellant powder 28 is arranged inside the enclosure 21. This quantity is that needed to obtain a pressure slightly above 280 MPa in the enclosure 21 and the barrel 23.

A test with the powder by itself without a ring 27 and a test with the powder and a ring 27 are carried out.

The combustion of the powder 28 in the enclosure 21 results in a pressure rise up to 280 MPa, at which pressure the bursting disc yields, causing hot gases to flow over the ring 27. The change in the temperature indicated by the thermocouple is recorded as a function of time and the heat impulse transmitted (quantity of heat supplied per unit of surface area) is calculated.

The results have been as follows:

|  | Maximum temperature (°C.) | Heat impulse (joule/cm$^2$) |
| --- | --- | --- |
| Powder by itself | 25.6 | 4.37 |
| Powder with ring 27 | 22.6 | 3.17 |

A 27% decrease in the heat impulse transmitted is observed in the case of a firing in the presence of an antierosive ring according to the invention, the associated loss in weight of the ring being 43.6%. Furthermore, measurements carried out at various points of the barrel 23 show a decrease in the heat impulse transmitted at all these points, which demonstrates that the spraying of oil over the inner surface of the tube does take place in a uniform manner in all the directions of ejection.

We claim:

1. A process for the manufacture of a composite material with lubricating properties consisting of a solid polymeric matrix containing throughout its mass, a uniform dispersion of liquid silicone oil droplets with lubricating properties, which consists essentially of preparing, in a first step, an emulsion of said liquid silicone oil with lubricating properties in a liquid phase of a monomer wherein said monomer is styrene or methylmethacrylate and said matrix contains polystyrene or polymethyl methacrylate, said liquid silicone oil being insoluble in said monomer, in the presence of a surface-active agent and in a second step polymerizing said emulsion wherein said surface-active agent is a block copolymer containing two-block or three-block repeat units, one repeat unit being compatible with said liquid oil and the other repeat unit being compatible with said monomer, said surface-active agent having a number-average molecular mass of between 500 and 500,000 and isolating said composite material of particle size between 5 and 45 microns.

2. The process according to claim 1, wherein said emulsion contains 20–85% of oil by weight of said emulsion.

3. The process according to claim 2, wherein said emulsion contains between 1 and 20% by weight of said surface-active agent relative to the weight of said liquid monomer.

4. The process according to claim 3, wherein said surface-active agent is a two-block or three-block block copolymer which is a member selected from the group consisting of polyoxyethylene-polydimethylsiloxane, polyoxypropylene-polydimethylsiloxane, polymethyl methacrylate-polydimethylsiloxane and polydimethylsiloxane-polyoxyethylene-polyoxypropylene.

5. The process according to claim 1, wherein said silicone compound has the formula

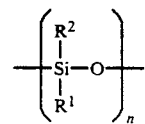

in which:
R$^1$ and R$^2$ are identical or different, and are methyl or phenyl, and
n is an integer between 10 and 10,000.

6. The process according to claim 5, wherein said silicone compound is polymethylphenylsiloxane of viscosity 710 centipoises (cP), or polydimethylsiloxane of viscosity 1,000 cP.

7. The process according to claim 1, wherein a cross-linking agent is added to said emulsion in the amount up to 30% by weight with respect to the weight of said monomer.

8. The process according to claim 7, wherein said cross-linking agent is divinyl benzene.

9. The process according to claim 1 wherein the polymerization in said second step is a radical polymerization promoted by an initiator.

10. The process according to claim 1 wherein the polymerization in said second step is promoted by radiation of the electromagnetic type.

* * * * *

UNITED STATES PATENT AND TRADEMARK OFFICE
CERTIFICATE OF CORRECTION

PATENT NO.   :   4,994,203

DATED        :   February 19, 1991

INVENTOR(S)  :   Alain Lefumeux, et al.

It is certified that error appears in the above-identified patent and that said Letters Patent is hereby corrected as shown below:

The Drawing Sheet, consisting of FIGS. 3 and 4, should be added as shown on the attached page.

Signed and Sealed this

Twenty-eighth Day of July, 1992

Attest:

DOUGLAS B. COMER

*Attesting Officer*    *Acting Commissioner of Patents and Trademarks*